K. DOUGAN.
APPARATUS FOR DAMPENING WHEAT AND OTHER MATERIALS.
APPLICATION FILED JUNE 19, 1907.
900,837.
Patented Oct. 13, 1908.
4 SHEETS—SHEET 1.
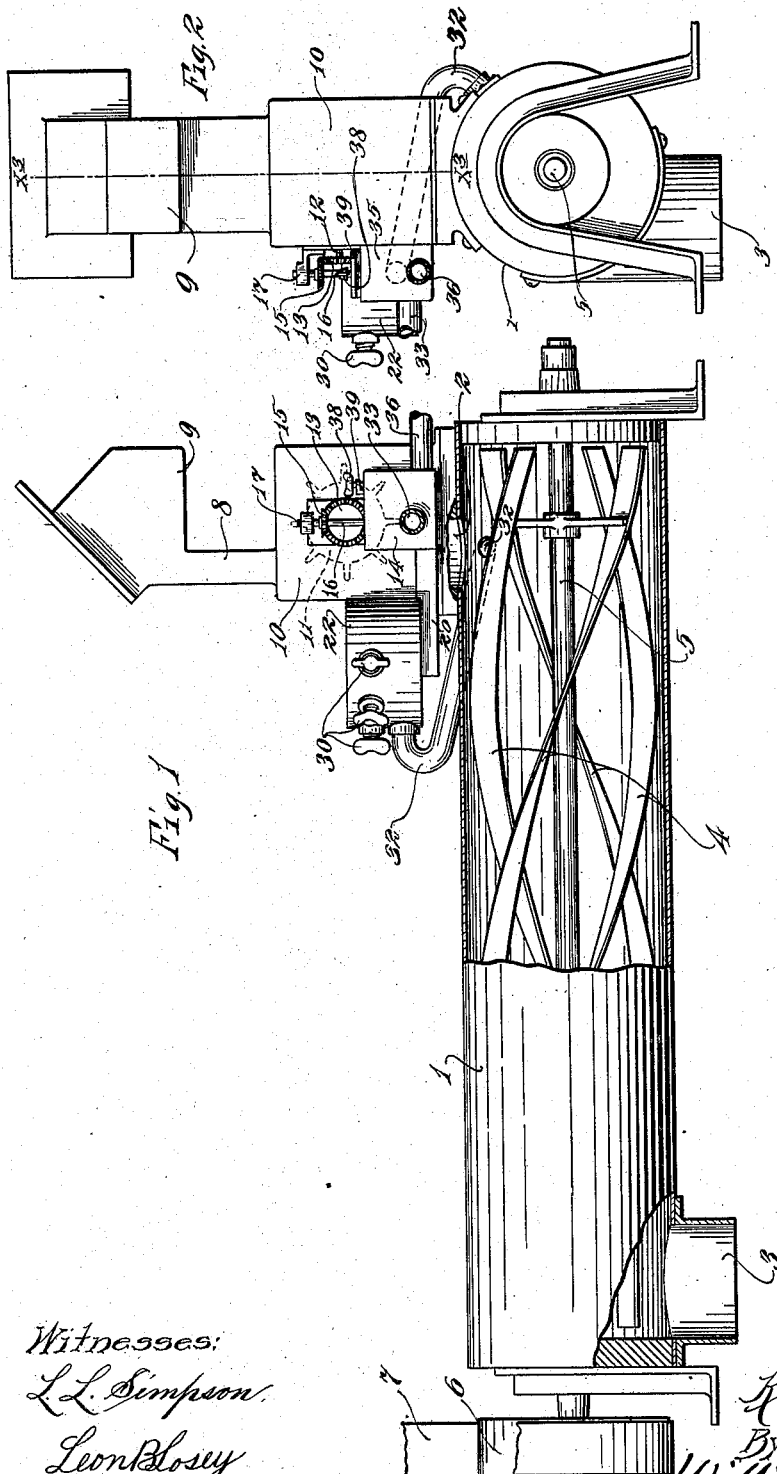

K. DOUGAN.
APPARATUS FOR DAMPENING WHEAT AND OTHER MATERIALS.
APPLICATION FILED JUNE 19, 1907.
900,837.
Patented Oct. 13, 1908.
4 SHEETS—SHEET 2.
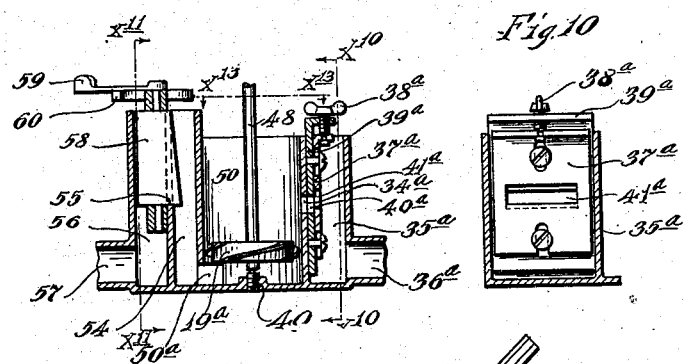
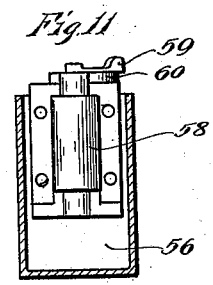
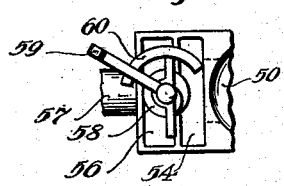
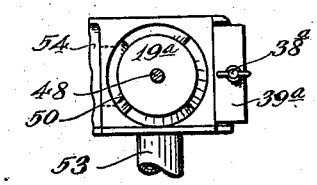
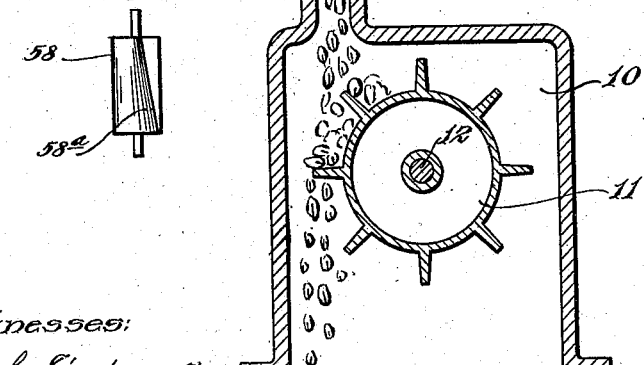

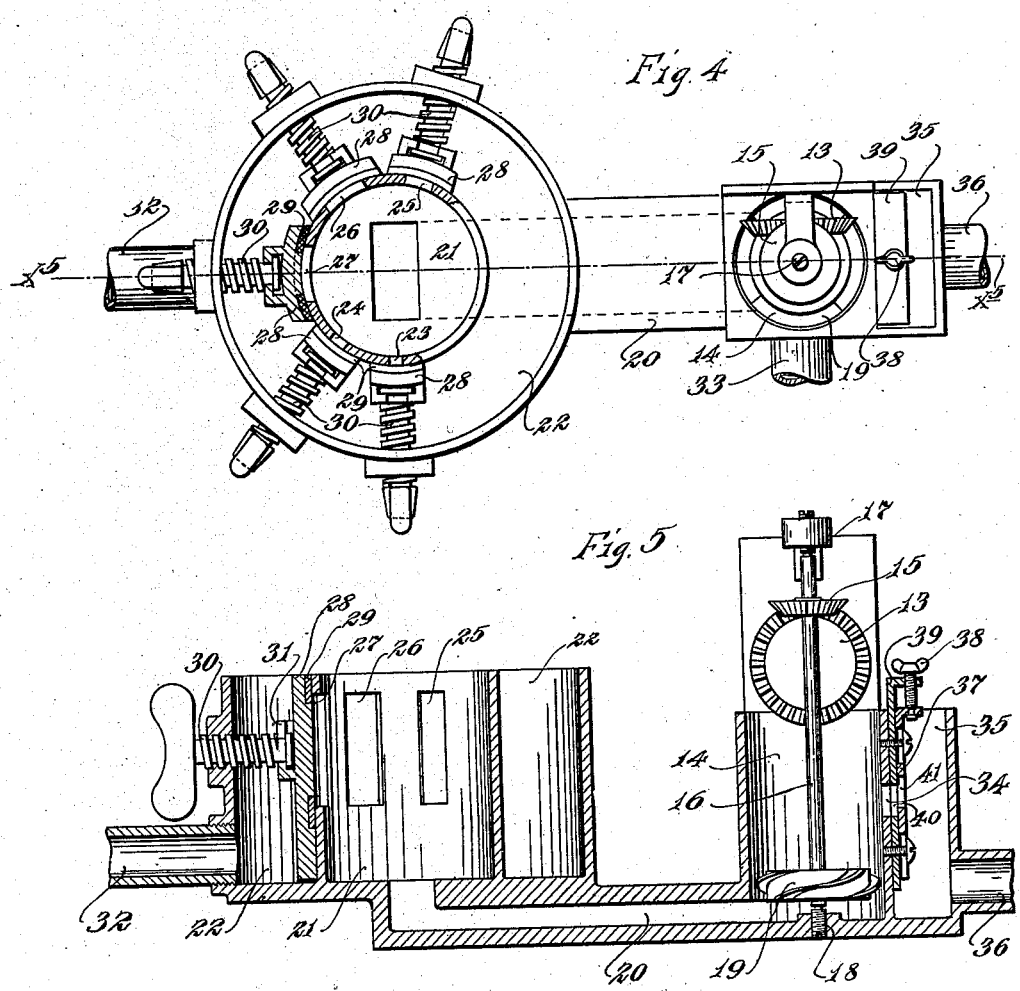

K. DOUGAN.
APPARATUS FOR DAMPENING WHEAT AND OTHER MATERIALS.
APPLICATION FILED JUNE 19, 1907.
900,837.
Patented Oct. 13, 1908.
4 SHEETS—SHEET 4.
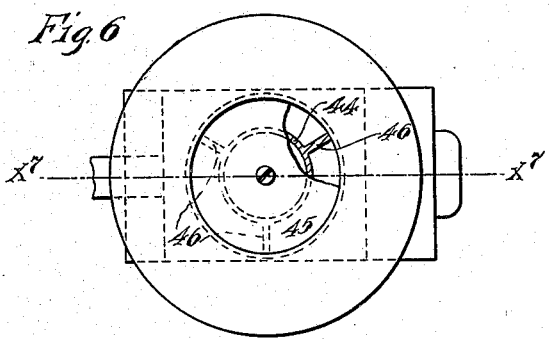
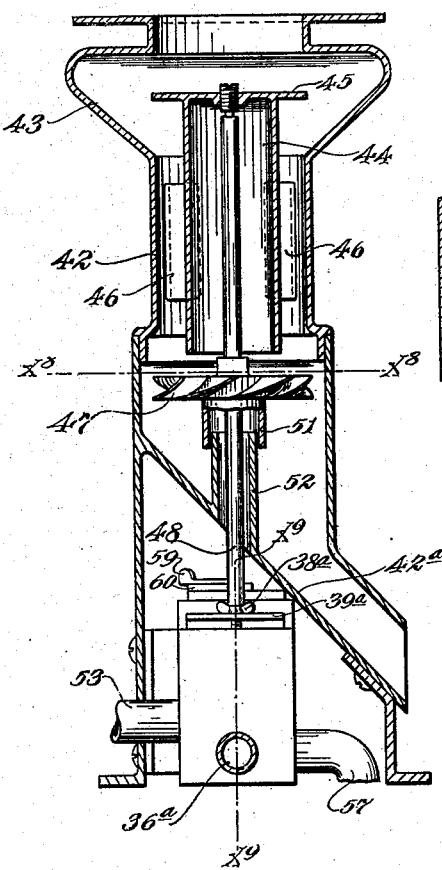
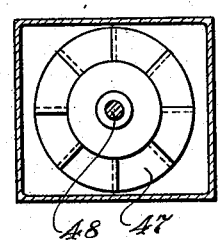
Witnesses:
L. L. Simpson
Leon B. Losey
Inventor:
Kennedy Dougan
By his Attorneys:
William M. Muchant

UNITED STATES PATENT OFFICE.

KENNEDY DOUGAN, OF MINNEAPOLIS, MINNESOTA.

APPARATUS FOR DAMPENING WHEAT AND OTHER MATERIALS.

No. 900,837.  Specification of Letters Patent.  Patented Oct. 13, 1908.

Application filed June 19, 1907. Serial No. 379,713.

*To all whom it may concern:*

Be it known that I, KENNEDY DOUGAN, a citizen of the United States, residing at Minneapolis, in the county of Hennepin and State of Minnesota, have invented certain new and useful Improvements in Apparatus for Dampening Wheat and other Materials; and I do hereby declare the following to be a full, clear, and exact description of the invention, such as will enable others skilled in the art to which it appertains to make and use the same.

My invention has for its object to provide an improved means for automatically supplying water or other liquid to wheat and other material which is to be dampened in predetermined desired amounts, and to this end it consists of the novel devices and combinations of devices hereinafter described and defined in the claims.

It is almost the universal custom to steam or dampen wheat before grinding it into flour. This is done to toughen the bran and to prevent the production of small particles of bran that are difficult to separate from the flour. Owing to several causes, the stream of wheat to be dampened varies from the uniform to a maximum amount, and unless the stream of water varies in the same proportion, the wheat will be unevenly dampened. In the devices hitherto used for mixing the water with wheat, the stream of wheat sometimes stops running entirely, while the water continues to flow, thus soaking and damaging the wheat and frequently even doing material damage to the building and machinery.

My invention, as above briefly indicated, provides means for automatically maintaining a flow of water to the wheat to be dampened which is proportional to the flow of the wheat. By this statement I do not mean that for a given flow of wheat per unit of time any particular amount of water must be supplied thereto. On the contrary, one important feature of my invention provides means whereby for a given flow of wheat per unit of time a variable amount of water may be supplied. Nevertheless, my improved mechanism is such that when set for a predetermined amount of water supply for a predetermined flow of wheat, the predetermined ratio or proportion of water to wheat will be automatically maintained under variations in the flow of the wheat. To illustrate by example, if the device is set to give one-fourth pound of water to one-hundred pounds of wheat under an extreme flow of wheat, the same ratio of one-fourth pound of water to one-hundred pounds of wheat will be maintained under all similar flows of the wheat, and on the other hand, if the device is set to give say one-half pound of water to one-hundred pounds of wheat under an extreme flow of the wheat, the same ratio of one-half pound of water to one-hundred pounds of wheat will be maintained under all lesser flows of the wheat.

In the operation of the preferred form of the machine shown in the drawings, the stream of wheat which is to be dampened coming into the dampening machine, is first deprived of its velocity and then allowed to fall a definite or determined distance upon a motor wheel that drives a water propeller. In this way, the motor wheel is driven with a velocity that will be proportional or dependent upon the amount of wheat per unit of time that is flowing or is dropped against the said impact wheel and, consequently, the propeller will exert a driving force in proportion to the speed of the motor wheel, and in this way is caused to force to the wheat an amount of water which will vary with and in proportion to the flow of the wheat. The commingled wheat and water are then preferably directed to a suitable mixer wherein the wheat and water are thrown around and the water is thoroughly commingled with all particles of the wheat.

In the accompanying drawings which illustrate the invention, like characters indicate like parts throughout the several views.

Referring to the drawings, Figure 1 is a view principally in side elevation, but with some parts broken away and with some parts sectioned, showing my improved water supplying mechanism applied to the wheat supply conduit of a mixing machine. Fig. 2 is a right hand end elevation of the parts shown in Fig. 1. Fig. 3 is a vertical section taken approximately on the line $x^3$ $x^3$ of Fig. 2. Fig. 4 is an enlarged detail in plan with some parts sectioned, showing the water regulating mechanism. Fig. 5 is a vertical section taken on the line $x^5$ $x^5$ of Fig. 4. Fig. 6 is a plan view illustrating a modified form of the device. Fig. 7 is a vertical section taken on the line $x^7$ $x^7$ of Fig. 6. Fig. 8 is a horizontal section taken on the line $x^8$ $x^8$ of Fig. 7. Fig. 9 is a vertical section taken on the line $x^9$ $x^9$ of Fig. 7. Fig. 10 is a vertical section taken on the line $x^{10}$ $x^{10}$ of Fig. 9. Fig. 11 is a vertical section taken on the line $x^{11}$ $x^{11}$ of Fig. 9. Fig. 12 is a plan view of certain of the parts shown in Fig. 9, other parts being broken away. Fig. 13 is a horizontal section taken approximately on the line $x^{13}$ $x^{13}$ of Fig. 9. Fig. 14 is a detail view in plan, showing the water regulating valve of the construction illustrated in Figs. 6 to 13 inclusive; and Fig. 15 is an end elevation of the said valve shown in Fig. 14.

Referring first to the construction illustrated in Figs. 1 to 5 inclusive, the numeral 1 indicates the approximately horizontal casing of the mixer, the same having an inlet passage 2 and an outlet passage 3. Rotatively mounted within the casing 1 is a reel 4, the shaft 5 of which projects at one end and is provided with a pulley 6 over which a power-driven belt 7 runs to impart rotary motion to the said reel and thereby cause the thorough commingling of the water with the wheat or other material delivered into the mixer.

The wheat is delivered into the casing 1 at the inlet 2 thereof through a conduit herein designated as a wheat conduit, or more broadly stated, the material conduit, and indicated as an entirety by the numeral 8. The wheat to be moistened is delivered into the open upper end of the conduit 8 from a feed spout or any other suitable device. Just below its upper or receiving end the conduit 8 is provided with a laterally offset portion 9 that affords a so-called intercepting chamber, and at its lower portion it is again expanded or enlarged to form a housing 10 for a motor wheel 11. This motor wheel, as best shown in Fig. 3, is much in the form of an over-shoot water wheel and it is so located that its peripheral radially projecting blades directly underlie the contracted intermediate portion of the wheat conduit 8, so that the wheat falling by gravity from the intercepting chamber 9 will strike the said blades with a predetermined force depending upon the distance that said wheel is located below the said intercepting chamber, and the said wheel will be driven with a velocity that will be proportional to or dependent upon the amount of wheat flowing or falling upon the wheel. The shaft 12 of this motor wheel is mounted in the walls of the housing 10 and projects through one wall and is provided with a bevel gear 13 that overlies an open-topped propeller chamber 14 which, as shown, is secured to one side of the housing 10. The gear 13 meshes with a bevel pinion 15 of a vertical shaft 16 mounted in suitable bearings 17 and 18, the former of which is secured to the top of the housing 10, and the latter of which is in the form of a step bearing and is secured in the bottom of said chamber 14. A small water wheel or spiral blade propeller 19 is secured to and carried by the lower end of the shaft 16. This propeller 19 is preferably in the form of a disk having small spiral blades on its periphery that work close to the surrounding walls of the chamber 14. The lower portion of the propeller chamber 14 communicates through a water conduit 20 with the bottom of a water distributing compartment 21 that is formed with a surrounding valve chamber 22. In its wall, the water distributing compartment 21 is formed with a multiplicity of slots or water escape passages 23, 24, 25, 26 and 27 that are adapted to be independently opened and closed by coöperating valves 28, which valves are shown as provided with pliable gaskets 29 that are engaged with the exterior wall of said chamber 21. Each valve 28 is adapted to be moved radially to and from its closed position by a screw 30. These screws 30 have threaded engagement with the wall of the valve chamber 22, and at their inner ends they are shown as detachably swiveled to open-topped seats 31 formed on the backs of the said valves. The lower ends of the valves 28 closely engage with the bottom of the chamber 22 and are thereby held against rotation. A water delivery pipe 32 leads from the lower portion of the valve chamber 22 and opens into the casing 1.

The water from some suitable source of supply is delivered into the wheel compartment 14 through a water supply pipe 33. In one side the wheel compartment 14 is provided with an overflow passage 34, the lower portion of which is on a level somewhat below the level of the water escape passages 23, 24, 25, 26 and 27 of the distributing compartment 21. This overflow passage 34 opens into an overflow compartment 35, from the lower portion of which an overflow pipe 36 extends to some suitable point, but preferably back to the source of supply. Preferably, but not necessarily, means is provided for vertically adjusting the overflow passage of the wheel compartment 14 and, as shown, this means comprises a vertically adjustable gate 37 which is connected by an adjusting screw 38 to a bearing plate 39 that is rigidly secured to the vertical wall of the compartment 14, as best shown in Figs. 4 and 5. The plate 39 is provided with a passage 40 that registers with the overflow passage 34, and the vertically adjustable gate 37 is provided with an overflow passage 41 that is adapted to be registered with or moved vertically in respect to the said passages 34 and 40.

The operation of the device described in detail is substantially as follows: The overflow passage 34 is so located and when adjustable should be so adjusted that when the propeller 19 is at rest all the water flowing into the chamber 14 from the supply pipe 33 will overflow through said overflow passage without rising in the distributing chamber 21 to the level of the lower portions of the escape passages 23 to 27 inclusive. When the wheat is to be dampened or mixed with water, one or more of the valves 28 should be moved outward so as to open up one or more of the coöperating escape passages. The stream of wheat to be dampened is then spouted to the machine and is delivered directly into the intercepting chamber 9 of the wheat supply conduit 8, and its momentum which is for various reasons uncertain up to this time is overcome and the wheat is brought temporarily to a point of rest. From the intercepting chamber 9, the wheat begins anew its downward movement under the action of gravity, and as it falls a predetermined distance from said intercepting chamber onto the motor wheel 11, it is evident that any given flow of wheat will operate with a definite or determined driving force upon the said wheel. To illustrate, a stream of wheat flowing at the rate of 200 pounds per minute or other unit of time will operate on said wheel with approximately twice the force of a stream of wheat falling at the rate of 100 pounds per minute, so that the impact wheel and, consequently, the water propeller 19 will be rotated at a speed approximately proportional to the amount of wheat that is flowing per unit of time to the mixer proper, which latter, in the present instance, is made up of a cylinder 1 and reel 4. When the said propeller 19 is thus rotated with the motor wheel 11, it produces a downward pressure on the water and thereby lowers the column of water in the chamber 14 and raises the column of water in the distributing compartment 21. The extent to which the water will rise in the compartment 21 will depend upon the speed of the propeller 19 and, consequently, the escape of water through the open escape passage or passages into the valve chamber 22 will depend upon and be approximately proportional to the amount of wheat flowing per unit of time. Of course, the greater the amount of water which is forced to escape through the open escape passages of the distributing compartment 21, the less will be the overflow of water through the overflow passage 34, and if the said propeller be driven at a sufficient speed it will so lower the level of the water in the chamber 14 that no water will escape through the overflow passage 34 and all the water will be forced through the escape passages of the distributing compartment 21.

Directing attention again to Figs. 4 and 5 it will be noted that the escape passages 23 to 27 inclusive vary in size. For the purpose of illustration we will assume that the said passages 23, 24, 25, 26 and 27 are of the proper size to give, respectively, one-eighth, one-fourth, one-half, three-fourths and four-fourths pounds of water to one-hundred pounds of wheat. Hence, as is evident, if all the said escape passages be open a maximum of two and five-eighths pounds of water to one-hundred-pounds of wheat may be supplied. It is also evident that intermediate amounts of water per one-hundred pounds of wheat may be supplied by opening up any two, three or four of the said escape passages. This device, as is evident, regulates the amount of water per one-hundred pounds or other unit of measure of the wheat. Stated in another way and briefly, the impact wheel and water propeller maintain a proportion between the height of the column of water in the chamber 21 and the amount of wheat supplied to the impact wheel, regardless of the relative proportion of water and wheat that are being mixed, and the proportion of water to wheat is varied at will by the regulation of setting of the water distributing valves.

While the escape passages 23 to 27 inclusive are in the drawings shown as rectangular, they may be of any form required to maintain the ratio between the water and wheat.

The modified form of the device illustrated in Figs. 6 to 15 inclusive will now be described. In this form of the device, the numeral 42 indicates the wheat delivery conduit, the upper end of which is open and is provided just below its open upper end with an expanded portion 43 that constitutes an intercepting chamber in which is secured an intercepting head 44 having an expanded deflecting plate 45 at its upper end and secured concentric to the body of the conduit by radial webs 46. The lower or delivery portion of the conduit 42 is shown as provided with an oblique bottom 42$^a$. The motor wheel 47 in this construction is provided with spiral blades that move in a horizontal plane and are located just below the annular passage formed between the depending portion of the intercepting head 44 and the surrounding walls of the conduit 42. Said impact wheel is carried by a vertical shaft 48 journaled at its upper end in a bearing on the deflecting plate 45 and journaled at its lower end on a step bearing 49 secured on the bottom of a wheel chamber 50, which latter is located below the inclined bottom 42$^a$ of the wheat conduit 42. By reference to Fig. 7 it will be seen that the shaft 48 extends through loosely telescoped sleeves 51 and 52, respectively, on the hub of the motor wheel 47 and on the oblique bottom 42$^a$. The water propeller 19$^a$ of this modification is directly secured to and carried by the lower end of the shaft 48, is positioned within and near the bottom of the wheel chamber 50. The water is supplied through a pipe 53 that opens into the lower portion of the chamber 50. The arrangement for controlling the overflow of water from the chamber 50 is the same as that described in connection with Figs. 1 to 5 inclusive, and the corresponding parts are designated by the same numerals with the character "a" added to each. The lower portion of the wheel chamber 50 opens through a passage 50ª into a water distributing compartment 54, which latter through a port 55 opens into another chamber 56 from which a water delivery pipe 57 leads to the mixer proper. The opening and closing of the port 55 is controlled by a rotary valve 58, the projecting trunnions of which are journaled in suitable bearings on the separating wall between the compartments 54 and 56, and to the upper of which trunnions is secured a small lever 59 that works frictionally over a fixed segment 60.

As best shown in Figs. 14 and 15, the valve 58 at one side is formed with a tapered conical portion 58ª, so that when it is moved into a position to open the port 55 it will produce an upwardly flaring passage therein for the escape of the water from the compartment 54 into the compartment 56. This valve is of such form that the portion immediately in action restricting the flow of water supplies water in proportion to the amount of wheat supplied to the motor wheel.

The improved machine or apparatus above described, while especially designed and adapted for the particular purpose set forth above is, nevertheless, well adapted for many other uses.

One of the minor features of my invention, as above stated, is directed to the arrangement of an intercepting chamber so that the grain is dropped a predetermined distance onto the so-called "impact wheel". This motor wheel may be driven in various different ways by the grain or other material passing through the conduit in which the said motor wheel is interposed or exposed to the action of the wheat or material.

The so-called water propeller of the above described device has an impact action on the water, which raises the altitude of the body of water in the water conduit in the vicinity of the water delivery passage of the latter, and causes the water to overflow through said passage. It is further important to note that this water propeller does not act positively to carry or elevate a definite, predetermined and unvarying amount of water for each rotation, but has an impact or driving action which, for effect, is dependent upon the speed of the propeller.

What I claim is:

1. The combination with two conduits arranged to deliver two flowing materials to a place where they are commingled, of a motor wheel in one of said conduits arranged to be driven by the force of the material flowing therethrough, and a delivery passage and a propeller in the other conduit, which propeller is driven by said motor wheel, at a speed proportionate to the speed thereof, and acts on the material in said latter conduit with a force which raises the altitude thereof, in the vicinity of said delivery passage and causes an overflow of said latter material, through said delivery passage, and hence a commingling of the two materials which is proportionate to the flow of the material passing through the first noted conduit, substantially as described.

2. In an apparatus for dampening wheat and other materials, the combination with a motor wheel arranged to be driven by the flowing stream of material to be dampened, of a water delivery conduit having a water delivery passage located above the normal water level, and an impact water propeller in said water conduit driven by said motor wheel at a speed proportionate to the speed thereof and acting on the water in said conduit with a force which raises the altitude of the water in the vicinity of said water delivery passage, whereby the water is caused to overflow through said delivery passage and to pass to the material to be dampened in proportion to the flow of said latter material, substantially as described.

3. The combination with a mixer, of a material conduit and a water conduit arranged to deliver into the same, said water conduit having a water delivery passage located above the normal water level, a motor wheel in said material conduit subject to the flow of the material to be dampened, and an impact water propeller in said water conduit driven from said motor wheel at a speed proportionate to the speed thereof, said water propeller operating on the water in said water conduit with a force which raises the altitude of the body of water in the vicinity of said water delivery passage and causes said water to overflow through said passage and to pass to the material to be dampened in proportion to the flow of the latter, substantially as described.

4. In an apparatus for dampening wheat and other materials, the combination with a motor wheel arranged to be driven by the flowing stream of the material to be dampened, a water conduit, a water propeller in said water conduit driven by said motor wheel at a speed proportionate to the speed of said wheel, and an adjustable water distributer adapted to be set for different proportionate amounts of water per unit of material to be dampened, substantially as described.

5. In an apparatus for dampening wheat and other materials, the combination with a motor wheel arranged to be driven by the flowing stream of material to be dampened, a water conduit, a water propeller in said water conduit for delivering the water to the material to be dampened, arranged to be driven by said motor wheel at a speed proportionate to the speed thereof, and a water distributer having a multiplicity of valved ports adapted to be variously set for different proportionate amounts of water per unit of material to be dampened, substantially as described.

6. In an apparatus for dampening wheat and other materials, the combination with a conduit for the material to be dampened, and a conduit for the water to be supplied thereto, of a motor wheel located in said material conduit and arranged to be driven by the material passed through said conduit, and a water propeller in said water conduit driven by said motor wheel at a speed proportionate to the speed thereof, the said water conduit having an overflow passage and one or more water delivery passages located above the normal water level, substantially as described.

7. In an apparatus for dampening wheat and other materials, the combination with a conduit for the material to be dampened and a conduit for the water to be supplied thereto, of a motor wheel located in said material conduit and arranged to be driven by the material passed through said conduit, a water propeller in said water conduit driven by said motor wheel, at a speed proportionate to the speed thereof, said water conduit having an overflow passage and one or more water delivery passages located above the normal water level, and means for vertically adjusting said overflow passage, substantially as described.

8. In an apparatus for dampening wheat and other materials, the combination with a conduit for the material to be dampened, of a motor wheel located in said conduit and arranged to be driven by the material passed through said conduit, and a water delivery conduit comprising a wheel chamber and a water distributing compartment having communication at their lower portions, said wheel chamber having an overflow passage and said water distributing compartment having one or more water delivery passages, a water propeller located in said wheel chamber and operative on the water which is below said overflow passage and water escape passages, and arranged to be driven by said motor wheel at a speed proportionate to the speed thereof, substantially as described.

9. The combination with a mixer, of a water conduit and a conduit for the material to be dampened, arranged to deliver into said mixer, a motor wheel located in said material conduit and arranged to be driven by the material passed through said conduit, a water propeller in said water conduit, driven by said motor wheel at a speed proportionate to the speed thereof, and a water distributer arranged to be set for different proportionate amounts of water per unit of material to be dampened, substantially as described.

10. The combination with a mixer, of a water conduit and a conduit for the material to be dampened arranged to deliver into said mixer, said water conduit comprising a wheel chamber and a water distributing compartment having communication at their lower portions, said wheel chamber having an overflow passage and said distributing compartment having one or more water delivery passages, a motor wheel in said material conduit, and a water propeller in said wheel chamber located below said overflow passage and arranged to be driven by said motor wheel at a speed proportionate to the speed thereof, substantially as described.

11. In an apparatus for dampening wheat and other materials, the combination with a water supply conduit and a conduit for the material to be dampened, said water conduit having an overflow passage and a multiplicity of water delivery passages, independent valves controlling said water delivery passages, a motor wheel in said material conduit, and a water propeller in said water conduit below said overflow passage, arranged to be driven by said motor wheel at a speed proportionate to the speed thereof, substantially as described.

12. In an apparatus for dampening wheat and other materials, the combination with a water supply conduit and a conduit for the material to be dampened, said water conduit comprising a wheel chamber and a water distributing compartment having communication at their lower portions, said wheel compartment having an overflow passage, and said distributing compartment having a multiplicity of water delivery passages varying in size, independent valves controlling said water delivery passages, a motor wheel in said material conduit arranged to be driven by the material passed through said conduit, and a water propeller in said wheel chamber below said overflow passage arranged to be driven by said motor wheel at a speed proportionate to the speed thereof, substantially as described.

In testimony whereof I affix my signature in presence of two witnesses.

KENNEDY DOUGAN.

Witnesses:
  H. D. KILGORE,
  F. D. MERCHANT.